United States Patent [19]
Soot

[11] 3,935,671
[45] Feb. 3, 1976

[54] MODULAR PLANTER PANEL SYSTEM

[76] Inventor: Olaf Soot, 9 Tomahawk Lane, Greenwich, Conn. 06830

[22] Filed: Feb. 11, 1974

[21] Appl. No.: 440,949

[52] U.S. Cl............ 47/34 R; 47/35; 47/39; 47/47; 49/404; 160/127; D13/1 K; D35/3 C
[51] Int. Cl.². A01G 9/02; A01G 9/12; A47G 7/02; F06B 9/00
[58] Field of Search........ 47/34, 35, 44, 47, 39, 47/45; D13/1 K; D6/137, 139; 160/127, 135; 49/404; 211/133, 182; D35/3 C

[56] References Cited
UNITED STATES PATENTS

| | | | |
|---|---|---|---|
| 317,939 | 5/1885 | Halfpenny | 47/44 |
| 1,013,662 | 1/1912 | Kramer | 47/39 X |
| 1,712,858 | 5/1929 | Tsuchii | 47/34 X |
| 2,113,523 | 4/1938 | White | 47/41 UX |
| 2,244,677 | 6/1941 | Cornell | 47/47 UX |
| 2,279,735 | 4/1942 | Gates | 47/33 |
| 2,686,988 | 8/1954 | Garber | 47/35 |
| 2,770,919 | 11/1956 | Shumaker | 47/39 |
| 2,831,644 | 4/1958 | Tillung | 211/182 X |
| 3,486,634 | 12/1969 | Frater | 211/133 |
| 3,596,701 | 8/1931 | Cowan | 160/135 |
| 3,810,330 | 5/1974 | Daggy | 49/404 |
| D161,230 | 12/1950 | Yellin | D6/137 |
| D172,500 | 6/1954 | Gurmin | 47/34 UX |

FOREIGN PATENTS OR APPLICATIONS

| | | | |
|---|---|---|---|
| 473,347 | 1/1915 | France | 47/47 |
| 1,078,295 | 11/1954 | France | 160/135 |
| 1,090,831 | 10/1960 | Germany | 47/47 |
| 211,979 | 4/1960 | Austria | 47/47 |
| 71,962 | 3/1960 | France | 47/39 |

OTHER PUBLICATIONS

"Planter Room Divider" Deltagram Sept./Oct. 1958.
"Modern Room Divider" Home Craftsman Sept./Oct. 1953, by Arthur Collani.
"Storage Planter" The Craftsman, Sept. 1957, by John Bergen.

*Primary Examiner*—Edgar S. Burr
*Assistant Examiner*—Steven A. Bratlie
*Attorney, Agent, or Firm*—Rene Oliveras, Esq.

[57] ABSTRACT

A modular planter panel system comprising a plurality of substantially identical modules forms decorative room dividers, partitions, or the like, by utilizing climbing plants such as ivy or vines. Each module substantially comprises: a frame; a planter box fixedly attached to the bottom portion of the frame and including the climbing plant; and relatively flexible means connecting associated portions of the frame for supporting the growing portions of the plant. Further means are included for supporting the module from the ceiling, from a horizontal overhead track, from a wall, or on the floor.

20 Claims, 19 Drawing Figures

FIG. 1A
FIG. 1B
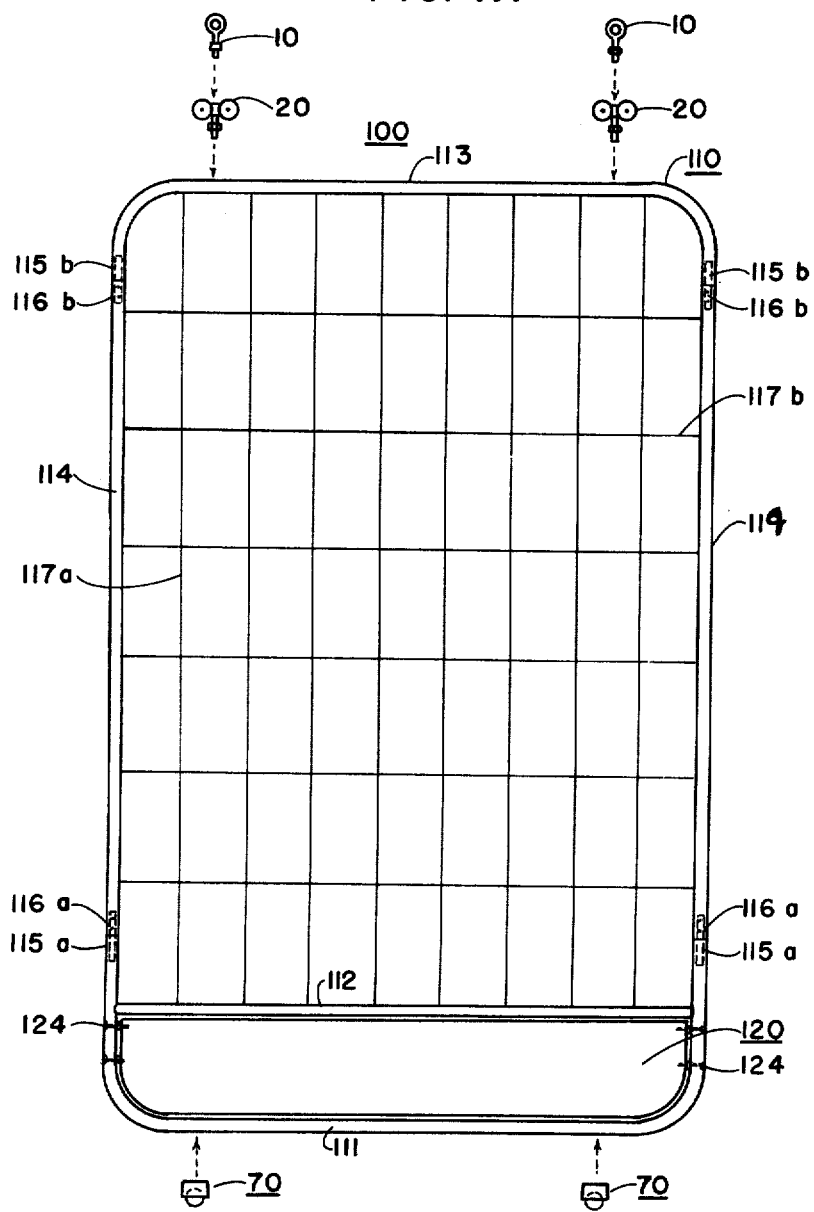
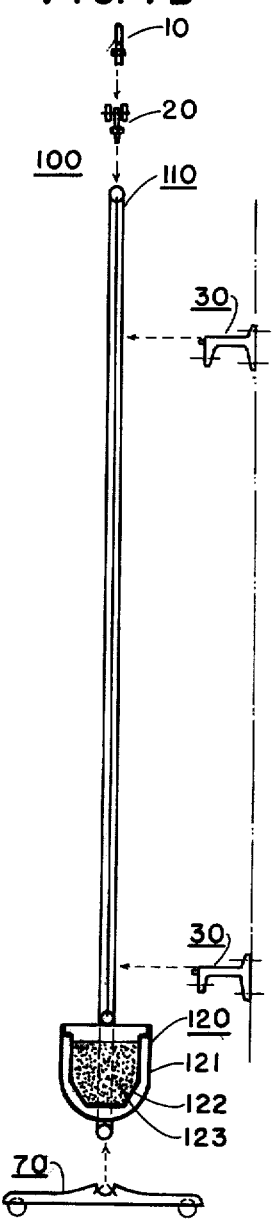

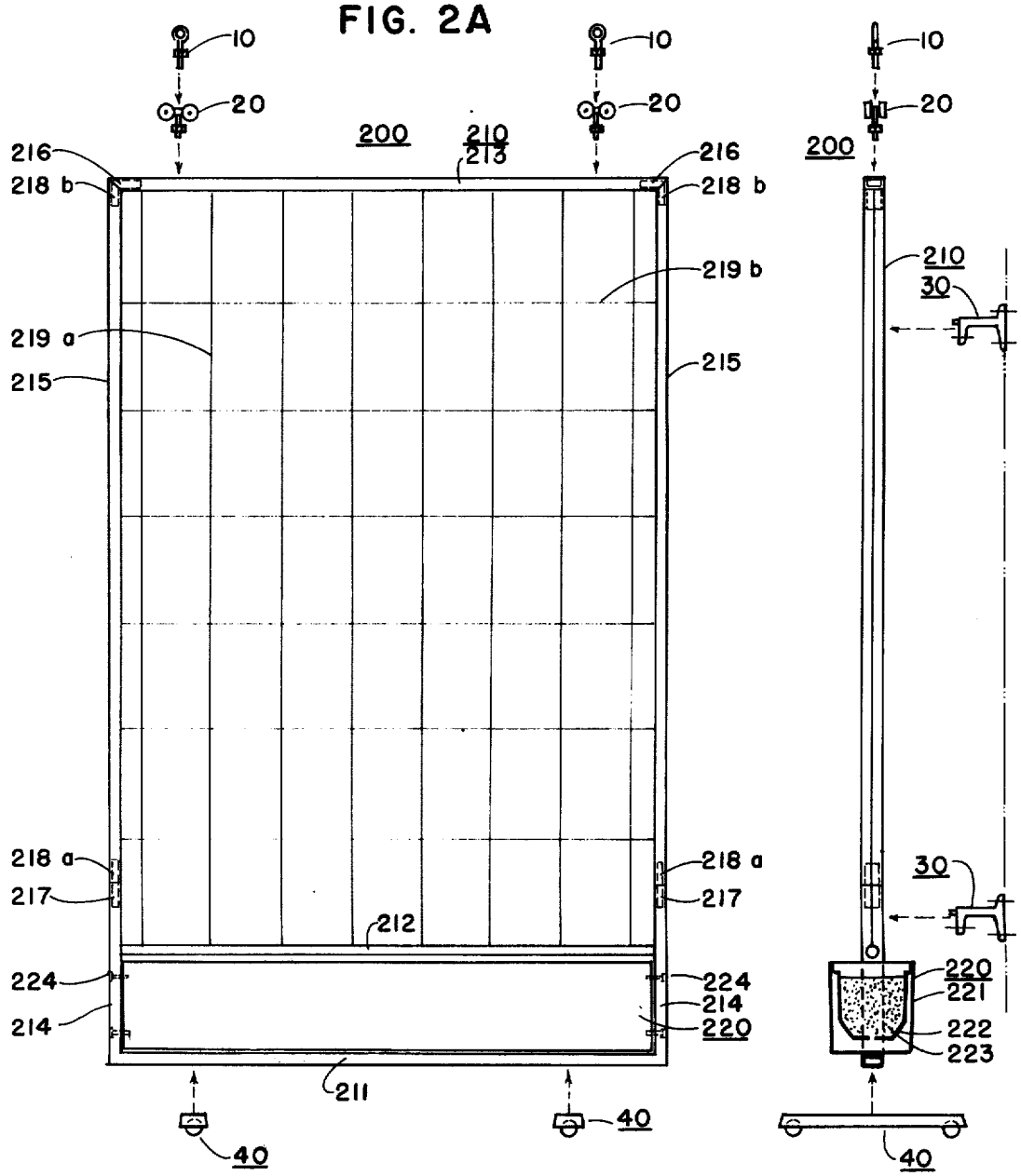

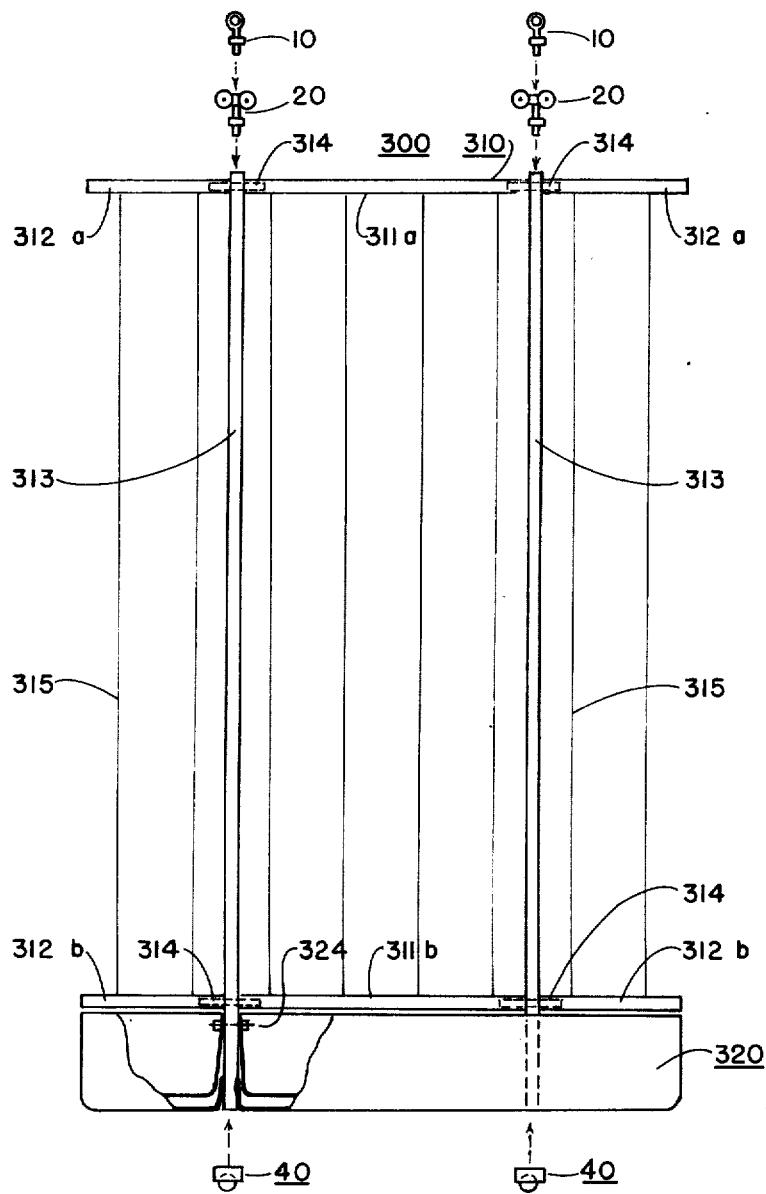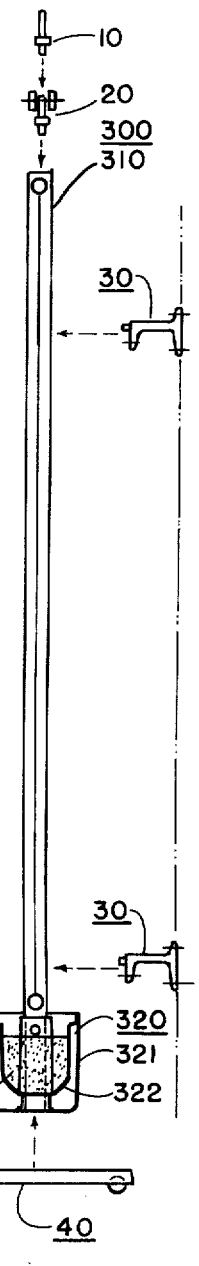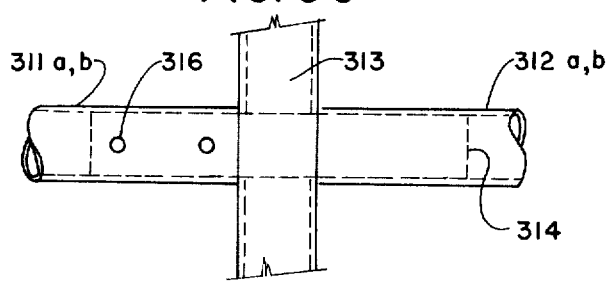

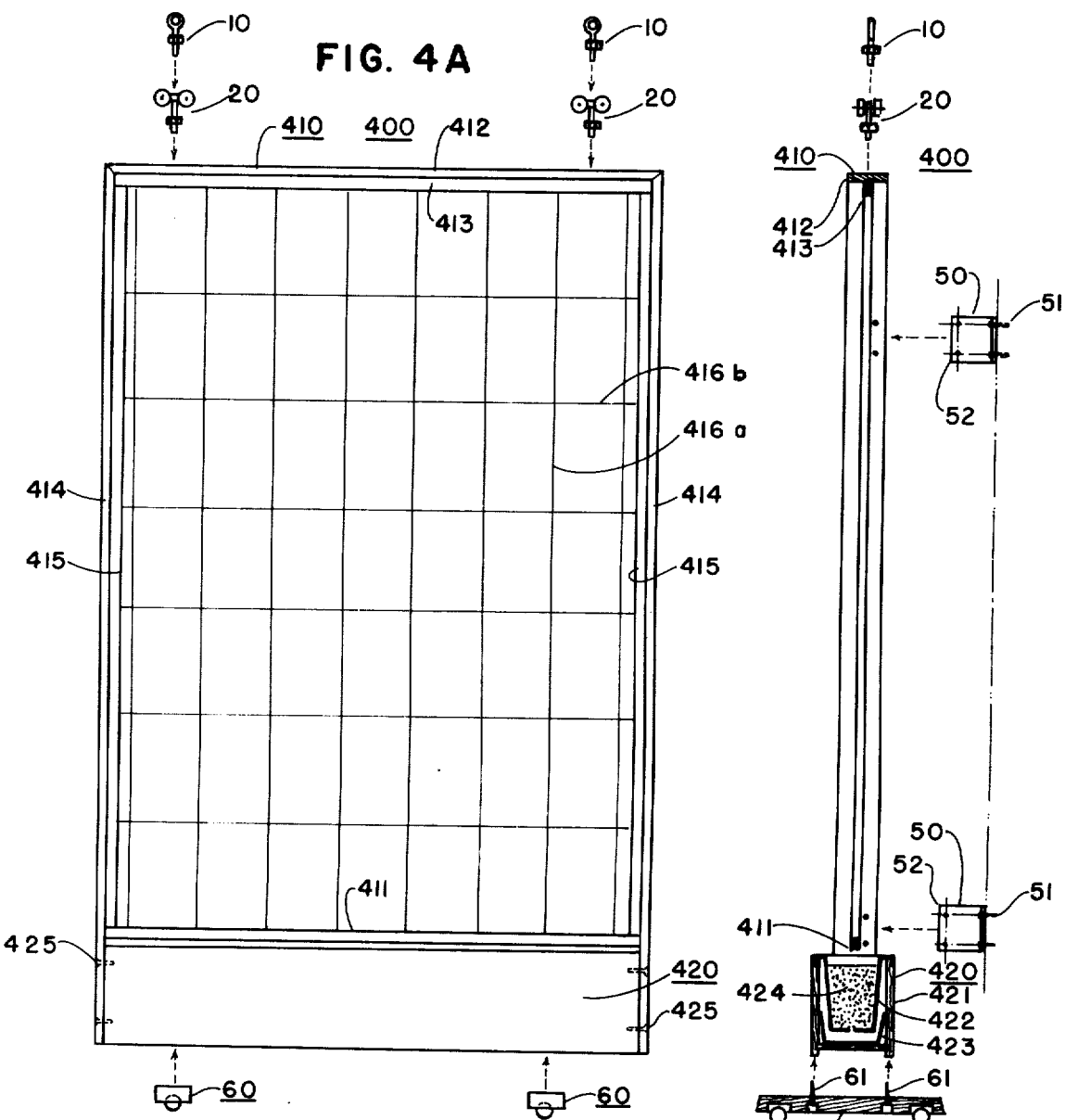
FIG. 4A
FIG. 4B
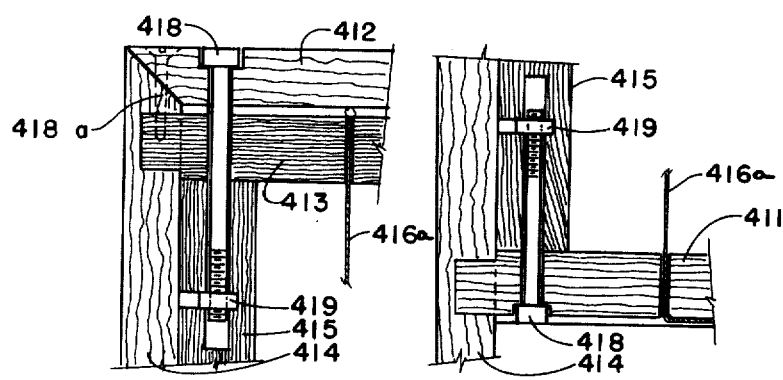
FIG. 4C    FIG. 4D

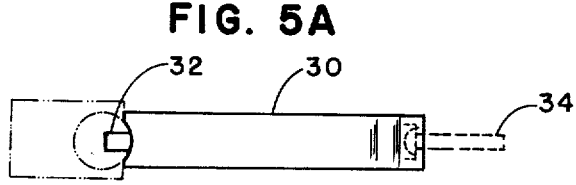
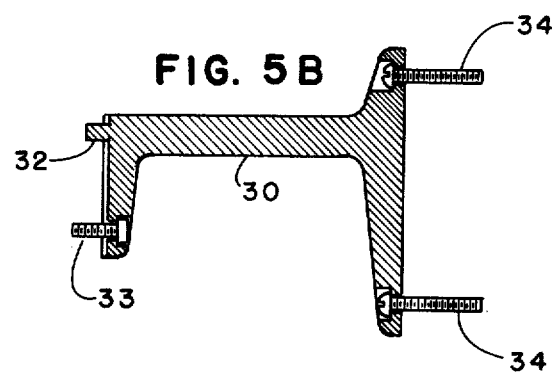
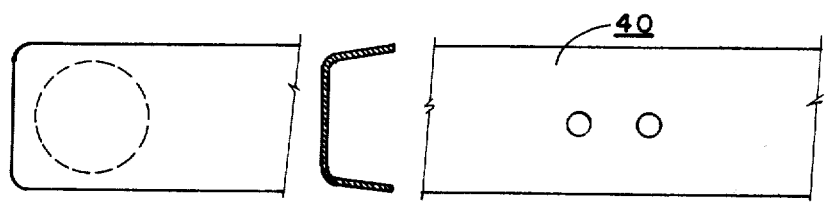
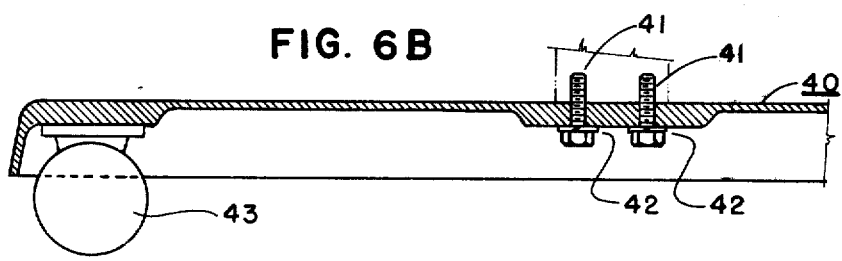
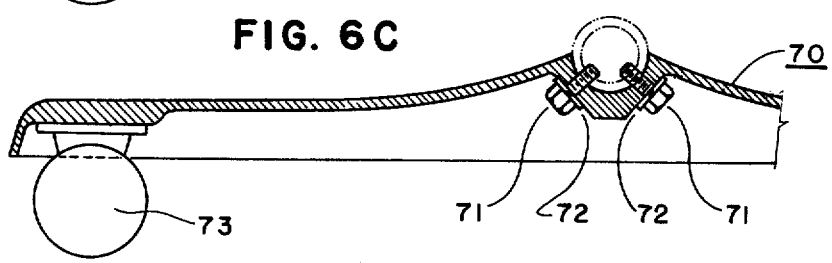

MODULAR PLANTER PANEL SYSTEM

FIELD OF THE INVENTION

This invention relates to space defining or dividing means and in particular to a modular panel system utilizing climbing plants.

BACKGROUND OF THE INVENTION

The use of ivy, vines or other similar climbing plants to enclose porches and balconies and to form decorative walls is common. This use, however, has so far been limited to fixed locations since climbing plants need the support of an associated permanent structure. As a result thereof, it would be impractical, for example, for an apartment dweller to use climbing plants for such decorative purposes, because such person would have to leave the plants behind when he moves. Further, while decorative climbing plant partitions would be ideally suitable for enclosing a sidewalk cafe or restaurant on a city street, such has not been the case because of the absence of movable portable climbing plant partitions. Similar reasoning applies in the case of offices, lobbies, and other locations where permanent arrangements are not always acceptable. In summary, the use of climbing plants to form partitions, etc., heretofore has been in conjunction with neither portable nor movable associated support structures.

Objects of the present invention are therefore to provide:
- a modular panel system for use in conjunction with climbing plants;
- a panel module which is readily movable, portable and transportable together with its associated climbing plants;
- a planter panel module which can be used individually with its associated climbing plants; and
- a planter panel system comprising a plurality of substantially identical associated modules to form extended curtains, partitions, walls, room dividers, or the like.

SUMMARY OF THE INVENTION

According to the present invention, a modular planter panel system comprising a plurality of substantially identical modules forms decorative room dividers, partitions, or the like, by utilizing climbing plants such as ivy or vines. Each module substantially comprises: a frame; a planter box fixedly attached to the bottom portion of the frame and including the climbing plant; and relatively flexible means connecting associated portions of the frame for supporting the growing portions of the plant within the interior of the frame. Each frame includes: top and bottom members; and at least one vertical member for rigidly connecting the top and bottom members, the planter box being fixedly attached to the bottom member.

According to the present invention, each module can be supported: from the ceiling by means such as eyebolts which are fixedly attached to the top member; from an associated horizontal overhead track by means such as roller carriers which are also fixedly attached to the top member; from a wall by means such as brackets which are fixedly attached to the vertical members; or on the floor by means such as bases which are fixedly attached to the bottom member.

Features of the present invention are therefore that:
- modules can be used individually or in combination to form a planter panel system;
- modules can be supported from the ceiling, associated horizontal overhead tracks, a wall, or on the floor; and
- modules can be interlocked and be supported on the floor without the need for separate support means.

Advantages of the present invention are therefore that:
- an individual module or a planter panel system including the associated climbing plants can be easily moved and transported;
- changeable configurations can be had without having to separate the climbing plants from their associated modules;
- module supporting means such as eyebolts, roller carriers, brackets, or bases can be utilized;
- the modular structure allows for the construction of varying sized units;
- climbing plants can be used in normally dark areas and can be periodically moved into light areas when necessary;
- the modular construction allows for the interchangeability of module supporting means such as eyebolts, roller carriers, brackets, and bases between modules;
- the modular construction allows for easy assembly and disassembly of the planter panel system; and
- individual modules or complete planter panel systems can be shipped disassembled and thereafter can be easily assembled by the purchaser.

DESCRIPTION OF THE DRAWING

Other objects, features and advantages of the present invention can be better appreciated by consideration of the following detailed description and the drawing in which:

FIGS. 1A and 1B are front and end cross-sectional views, respectively, of a first illustrative embodiment of a planter panel module according to the present invention;

FIGS. 2A and 2B are front and end cross-sectional views, respectively, of a second illustrative embodiment of a planter panel module;

FIGS. 3A and 3B are front and end cross-sectional views, respectively, of a third illustrative embodiment of a planter panel module, while FIG. 3C is illustrative of the connection between the horizontal and vertical members thereof;

FIGS. 4A and 4B are front and end cross-sectional views, respectively, of a fourth illustrative embodiment of a planter panel module, while FIGS. 4C and 4D are illustrative of the connection between the horizontal and vertical members thereof;

FIGS. 5A and 5B are top and end cross-sectional views, respectively, of a wall bracket used to support a planter panel module according to the present invention;

FIGS. 6A and 6B are partial plan and partial end cross-sectional views of a base used to support the second and third module types, while FIG. 6C is a partial end cross-sectional view of a base used to support the first module type;

DETAILED DESCRIPTION

Figure 7:
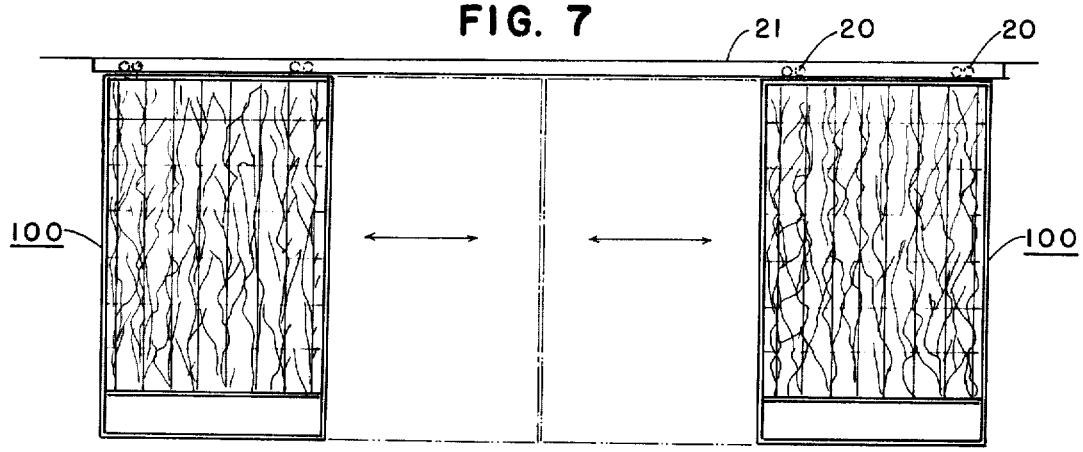
FIG. 7 is illustrative of a modular planter panel system supported by roller carriers.

FIGS. 1A and 1B are front and end cross-sectional views, respectively, of a first illustrative embodiment of a planter panel module according to the present invention. Module 100 substantially comrises frame 110, planter box 120, and relatively flexible plant supporting means 117a and 117b. Frame 110 includes bent top member 113, straight vertical side members 114, and a bottom member further including bent member 111 and straight horizontal member 112. Each member is advantageously made of round tubular steel, aluminum or plastic. Bent member 111 is fixedly attached to straight horizontal member 112. Member interconnection sleeves 115a are fixedly attached to member 111 while sleeves 115b are fixedly attached to member 113. Vertical members 114 are connected to bent members 111 and 113 by sliding them over pre-exposed portions 116a and 116b of sleeves 115a and 115b and by thereafter appropriately inserting pins or screws through the sleeves to form a rigid frame. Various lengths of the members can be used in conjunction with all other standard components to effect construction of modules having different configurations.

Relatively flexible plant supporting means 117a and 117b such as wires, strings, cables, small rods, or a grill network are appropriately fastened to members 112, 113, and 114 of frame 110 in either the vertical and/or horizontal directions as desired for supporting the associated climbing plants, not shown.

Planter box 120 is fastened at its ends to bent member 111 by utilizing appropriate mechanical fastening means such as screws at locations 124. Box 120 is advantageously made of either plastic or metal. In this embodiment, outside shell 121 and inside shell 122 of box 120 are fastened together along their common top edges so as to provide a space for water between the two shells. Inside shell 122 includes holes near its top edge for allowing necessary evaporation of the water. Inside shell 122 includes therein soil 123 for growing the climbing plants, not shown. Alternatively, a single outside shell can be used, proper drainage being accomplished by placing porous material, not shown, underneath soil 123.

Module 100 can be supported from the ceiling, an associated horizontal track, a wall or on the floor. For example, eyebolts 10 can be attached to bent member 113 for supporting module 100 from the ceiling. Further, roller carriers 20 can also be attached to bent member 113 for supporting module 100 from an associated horizontal track while allowing for horizontal motion of the module. Finally, brackets 30 can be attached to vertical members 114 while bases 70 can be attached to bent member 111 for respectively supporting module 100 from a wall or on the floor. Any such supporting method can of course be adaptable to module 100 as desired. These module supporting means and their respective uses are more specifically described with reference to FIGS. 5 through 9.

FIGS. 2A and 2B are front and end cross-sectional views, respectively, of a second illustrative embodiment of a planter panel module. In this case, module 200 substantially comprises frame 210, planter box 220, and relatively flexible plant supporting means 219a and 219b. Frame 210 includes: straight horizontal top member 213; straight vertical side members 215; and a bottom member further including straight horizontal members 211 and 212 and straight vertical members 214. Again, each member is advantageously made of steel, aluminum or plastic. Horizontal members 211 and 212 are fixedly attached to vertical members 214. Member inter-connection sleeves 217 are fixedly attached to the top ends of vertical members 214 while right angle inter-connection sleeves 216 are fixedly attached to the ends of horizontal member 213. Vertical members 215 are connected to members 213 and 214 by sliding them over pre-exposed portions 218a and 218b of sleeves 217 and 216 and by thereafter appropriately inserting pins or screws through the sleeves to form a rigid frame. Again, various lengths of the members can be used in conjunction with all other standard components to effect construction of modules having different configurations.

Relatively flexible plant supporting means 219a and 219b such as wires, strings, cables, small rods, or a grill network are appropriately fastened to members 212, 213, and 215 of frame 210 in either the vertical and/or horizontal directions as desired for supporting the associated climbing plants, not shown.

Planter box 220, including outside shell 221 and inside shell 222, is fastened to frame 210 at locations 224 and is identical to planter box 120, except that outside shell 221 is rectangular. Soil 223 is located within inside shell 222.

Again, module 200 may have associated supporting means such as eyebolts 10, roller carriers 20, brackets 30, or bases 40.

FIGS. 3A and 3B are front and end cross-sectional views, respectively, of a third illustrative embodiment of a planter panel module, while FIG. 3C is illustrative of the connection between the horizontal and vertical members thereof. In this case, module 300 substantially comprises frame 310, planter box 320, and relatively flexible plant supporting means 315. Frame 310 includes straight horizontal top members 311a and 321a, straight vertical interior members 313; and straight horizontal bottom members 311b and 312b. Each member is, of of course, advantageously made of steel, aluminum, or plastic. Round tubular inter-connection sleeves 314 are inserted through holes on the sides of members 313 and rigidly fastened to the ends thereof. Members 312a and 312b are fixedly attached to associated sleeves 314 while members 311a 311b are connected to members 313 by sliding them over the pre-exposed portions of sleeves 314 and thereafter appropriately inserting pins or screws through the sleeves such as at locations 316 to form a rigid frame. See FIG. 3C.

Again, relatively flexible plant supporting means 315 such as vertical wires, strings, cables or small rods are appropriately fastened to members 311a, 311b, 312a, and 312b of frame 310 for supporting the associated climbing plants, again not shown. The relatively flexible plant supporting means can also be run in the horizontal direction, if desired.

In this embodiment, inside shell 322 of planter box 320 has holes at its bottom for drainage of water and small holes near its top edge for evaporation. Both inside shell 322 and outside shell 321 have sleeves which fit around vertical members 313. Planter box 320 is connected to vertical members 313 by bolting the sleeves of inside shell 322 to members 313 with bolts such as at location 324. Inside shell is filled with soil 323 for growing the climbing plants. Alternatively, a single outside shell with sleeves can be used and appropriate drainage can be accomplished by placing porous material, not shown, underneath soil 323.

Again, module 300 may have associated supporting means such as eyebolts 10, roller carriers 20, brackets 30, or bases 40 as mentioned hereinbefore. Also, various lengths of the members can be used in conjuction with all other standard components to effect construction of modules having different configurations.

FIGS. 4A and 4B are front and end cross-sectional views, respectively, of a fourth illustrative embodiment of a planter panel module, while FIGS. 4C and 4D are illustrative of the connection between the horizontal and vertical members thereof. In this case, module 400 substantially comprises frame 410, planter box 420, and relatively flexible plant supporting means 416a,b. Frame 410 includes: a top member further including associated straight horizontal members 412 and 413; two side members each including straight vertical outer member 414 and straight vertical inner member 415; and straight horizontal bottom member 411. All members of frame 410 are of wood construction. Members 414 and 415 are either glued to each other or milled out of one piece of wood. Members 411, 412, 413, 414, and 415 are of rectangular cross-section.

Module 400 is constructed and assembled as follows: the rounded ends of horizontal members 411 and 413 are plated into holes in vertical members 414. Bolts 418 are placed into pre-drilled holes in members 411 and 415 and are tightened against nuts 419, which nuts are placed into slotted holes in members 415. See FIGS. 4C and 4D. Thereafter, planter box 420 is screwed to the bottom ends of members 414 with screws such as at locations 425. Now, relatively flexible plant supporting means 416a such as vertical wires, strings, cables or small rods, for supporting the climbing plant, is pulled through the holes in members 411 and 413 and tightened. Once this is done, member 412 is placed on top of member 413 and bolts 418 are placed into pre-drilled holes in members 412, 413, and 415 and tightened against nuts 419 which are placed into slotted holes in member 415, as stated before. See FIG. 4C. Top member 412 is further fastened to members 414 and 413 by wood screws 418a. Thus, a rigid planter panel frame is formed. Again, various lengths of the members can be used in conjunction with all other standard components to effect construction of modules having different configurations. Also, the relatively flexible plant supporting means can also be run in the horizontal direction. See plant supporting means 416b.

Planter box 420 can advantageously include outside wood box 421 and associated plastic or metal tray 423 at its bottom. Inside shell 422 is fastened at its top edge to outside box 421 so as to provide a space between tray 423, box 421, and inside shell 422. Inside shell 422 includes holes at its bottom for drainage and small holes near its top edge for evaporation. Inside shell 422 is filled with soil 424 for the climbing plants, not shown. Alternatively, tray 423 and the drainage holes on inside shell 422 may be eliminated. In such case, appropriate drainage can be effected by placing porous material, not shown, along the bottom of inside shell 422, underneath soil 424.

Module 400 may have associated supporting means such as eyebolts 10, roller carriers 20, angle brackets 50, or bases 60. For example, module 400 can be mounted on a wall by utilizing angle brackets 50, which are made of bent sheet metal, by bolting one leg of the angle brackets to the wall such as at location 51 and by bolting the other leg to member 414 such as at location 52. Further, module 400 can be supported on the floor by wood bases 60 which include cavities for swivel rollers 62. Bases 62 are bolted to the bottom sides of outside box 421 with wood screws such as at locations 61.

FIGS. 5A and 5B are top end cross-sectional views, respectively, of a wall bracket used to support a planter panel module. Bracket 30 is advantageously made of die cast or extruded metal and includes round pin 32 at one end, which pin fits into holes located in the frame's vertical member. Bracket 30 is fastened to the wall with bolts 34. The planter frame can be temporarily supported by pins 32 until bolt 33 is screwed into tapped holes also located in the frame's vertical member.

FIGS. 6A and 6B are partial plan and partial end cross-sectional views of a base used to support planter panel modules 200 and 300 on the floor. Base 40 is advantageously made of cast or stamped metal or plastic and is supported by swiveable rollers 43. Bolts 41 together with lock washers 42 are used for fastening base 40 to frames 210 and 310.

FIG. 6C is a partial end cross-sectional view of a base used to support planter panel module 100 on the floor. Base 70 is also advantageously made of cast or stamped metal or plastic and is also supported by swivelable rollers 73. In this case, bolts 71 together with lock washers 72 are used for fastening base 70 to frame 110.

FIG. 7 is illustrative of a modular planter panel system supported by roller carriers and an associated horizontal overhead track. In this case, for example, modules 100 are supported by roller carriers 20 in conjuction with horizontal overhead track 21. The arrows indicate the horizontal motion of modules 100. One or more modules and one or more associated overhead tracks can be used to form a movable planter panel system. Such a movable system can serve the functions of a shade or a curtain near a window or that of a partition or room divider.

Figure 8:
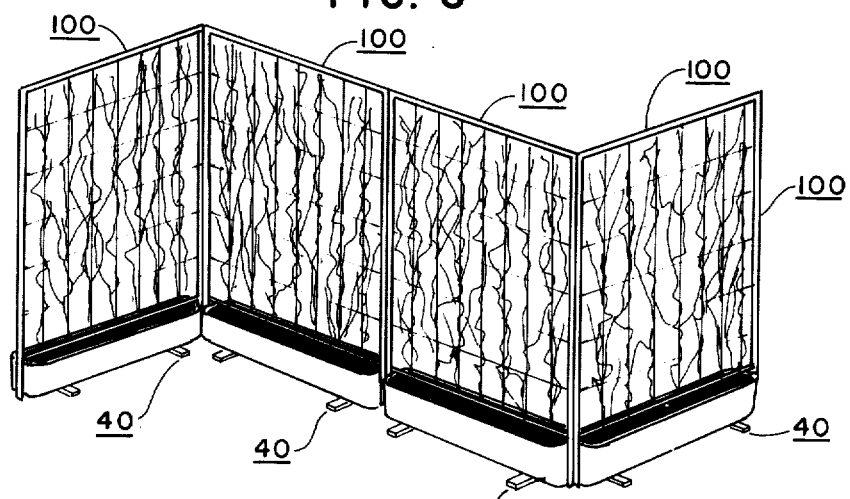
FIG. 8 is illustrative of a modular planter panel system supported by bases.

FIG. 8 is illustrative of a modular planter panel system supported by bases on the floor. In this case, for example, modules 100 are supported on the floor by associated bases 40. This type system can form movable decorative walls, partitions or other space dividers without the need for overhead tracks or wall brackets.

Figure 9:
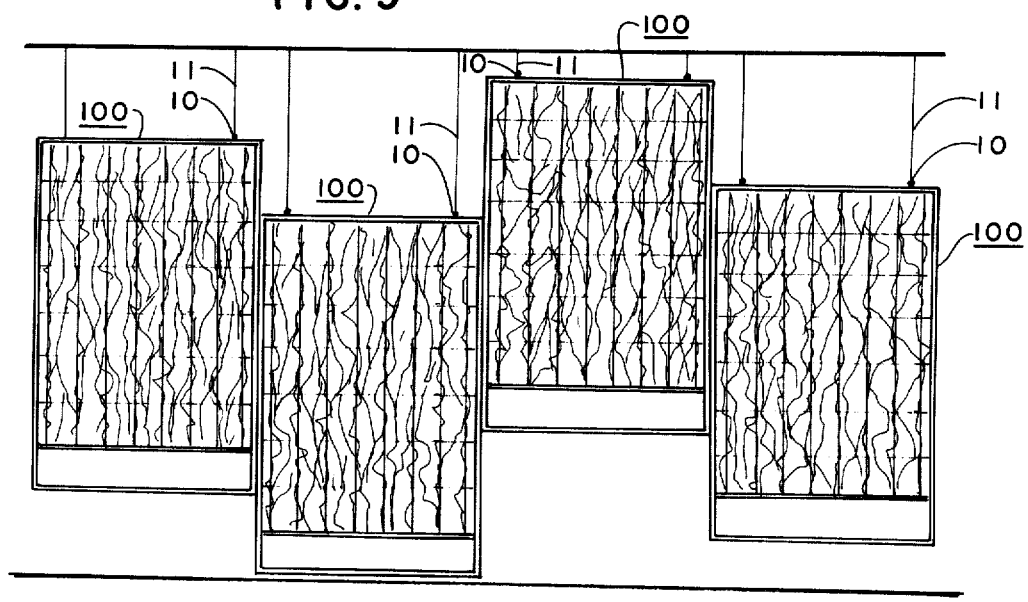
FIG. 9 is illustrative of a modular planter panel system supported by eyebolts.

FIG. 9 is illustrative of a modular planter panel system supported by eyebolts from the ceiling. In this case, for example, modules 100 are supported from the ceiling by associated eyebolts 10 and cables 11. This type system can also be used for forming decorative walls, partitions or other space dividers. Cables 11 can be either dead hung or connected to winches to allow individual modules or groups of modules to be vertically movable.

All of the above systems can be used in combination with each other. In addition, adjacent modules in a system can be rotatbly attached to each other at their respective vertical members thereby allowing such adjacent modules to be positioned at varying angles relative to each other. In such a case, upright stable partitions can be formed. Further, the module frame could be triangular, circular, or of any other desired shape. Also, the plant supporting means could be directed diagonally or in any other desired direction.

While the modular planter panel system of the present invention has been described in terms of specific illustrative embodiments, it will be apparent to those skilled in the art that many modifications are possible within the spirit and scope of the disclosed principle.

What is claimed is:

1. A movable module for use as a decorative room divider, partition, or the like, for use with a climbing plant, said movable module comprising:
   a stiff self-supporting planar frame, said frame including at least one top horizontal member, at least one bottom horizontal member, and at least two vertical members removably connected to said top and bottom members, said top, bottom, and vertical members defining the plane of said frame, said top, bottom, and vertical members each including means from which said module can be selectively supported from any one or more than one of said frame members whereby said module can be supported by several different modes of external support;
   a horizontal planter box for a plant comprising an inner container with drainage holes and an outer container;
   planter box attaching means located within said frame plane centrally attaching said planter box within said frame members; and
   relatively flexible plant supporting means connected to and supported by said frame members, within said frame members and above said planter box for supporting growing portions of a plant.

2. The module of claim 1 further comprising means attached to said top member for suspending said module from a location above said frame and within said frame plane.

3. The module of claim 1 in combination with fixed horizontal track means located above said frame, said module further comprising roller means attached to said top member, said roller means including rollers which ride along said horizontal track means.

4. The module of claim 1 further comprising bracket support means attached to one of said vertical members for supporting said module from a location above said bottom member and below said top member.

5. The module of claim 1 further comprising support means attached to said bottom member for supporting said module from a location below said frame.

6. The module of claim 1 wherein said plant supporting means are vertical and connected to said top member and a bottom member.

7. The module of claim 1 wherein said plant supporting means are horizontal and connected to said vertical members.

8. The module of claim 1 wherein said plant supporting means comprises grill network means, said grill network means including vertical elements connected to said top member a bottom member and including horizontal elements connected to said vertical members.

9. The module of claim 1 wherein said planter box attaching means attaches said planter box to said vertical members within said frame plane.

10. A modular planter panel system comprising a plurality of substantially identical movable modules for use as a decorative room divider, partition, or the like, for use with associated climbing plants, each such movable module further comprising:
    a stiff self-supporting planar frame, said frame including at least one top horizontal member, at least one bottom horizontal member, and at least two vertical members removably connected to said top and bottom members, said top, bottom, and vertical members defining the plane of said frame, said top, bottom, and vertical members each including means from which said module can be selectively supported from any one or more than one of said frame members whereby said module can be supported by several different modes of external support;
    a horizontal planter box for a plant comprising an inner container with drainage holes and an outer container;
    planter box attaching means located within said frame plane centrally attaching said planter box within said frame members; and
    relatively flexible plant supporting means connected to and supported by said frame members, within said frame members and above said planter box for supporting growing portions of a plant.

11. A movable module for use as a decorative room divider, partition, or the like, for use with a climbing plant, said movable module comprising:
    a stiff self-supporting planar frame, said frame including at least one top horizontal member, at least one bottom horizontal member, and at least two vertical members removably connected to said top and bottom members, said top, bottom, and vertical members defining the plane of said frame, said top and vertical members each including means from which said module can be selectively supported from any one or more than one of said top and vertical frame members whereby said module can be supported by several different modes of external support;
    a horizontal planter box for a plant comprising an inner container with drainage holes and an outer container, said planter box including an upper open portion and a lower closed portion, said planter box lower closed portion including means for supporting of the module;
    planter box attaching means located within said frame plane centrally attaching said planter box upper portion immediately adjacent said bottom horizontal frame member; and
    relatively flexible plant supporting means connected to and supported by said frame members, within said frame members and above said planter box for supporting growing portions of a plant.

12. The module of claim 11 further comprising means attached to said top member for suspending said module from a location above said frame and within said frame plane.

13. The module of claim 11 in combination with fixed horizontal track means located above said frame, said module futher comprising roller means attached to said top member, said roller means including rollers which ride along said horizontal track means.

14. The module of claim 11 further comprising bracket support means attached to one of said vertical members for supporting said module from a location above said bottom member and below said top member.

15. The module of claim 11 further comprising support means attached to said bottom member for supporting said module from a location below said frame.

16. The module of claim 11 wherein said plant supporting means are vertical and connected to said top and bottom members.

17. The module of claim 11 wherein said plant supporting means are horizontal and connected to said vertical members.

18. The module of claim 11 wherein said plant supporting means comprises grill network means, said grill network means including vertical elements connected to said top and bottom members and including horizontal elements connected to said vertical members.

19. The module of claim 11 wherein said planter box attaching means attaches said planter box to said vertical members within said frame plane.

20. A modular planter panel system comprising a plurality of substantially identical movable modules for use as a decorative room divider, partition, or the like, for use with associated climbing plants, each such movable module comprising:

a stiff self-supporting planar frame, said frame including at least one top horizontal member, at least one bottom horizontal member, and at least two vertical members removably connected to said top and bottom members, said top, bottom, and vertical members defining the plane of said frame, said top and vertical members each including means from which said module can be selectively supported from any one or more than one of said top and vertical frame members whereby said module can be supported by several different modes of external support;

a horizontal planter box for a plant comprising an inner container with drainage holes and an outer container, said planter box including an upper open portion and a lower closed portion, said planter box lower closed portion including means for supporting of the module;

planter box attaching means located within said frame plane centrally attaching said planter box upper portion immediately adjacent said bottom horizontal frame member; and relatively flexible plant supporting means connected to and supported by said frame members, within said frame members and above said planter box for supporting growing portions of a plant.

* * * * *